Patented Sept. 20, 1932

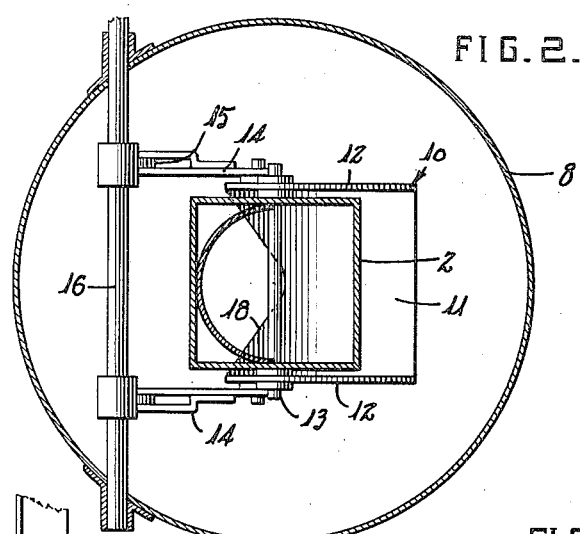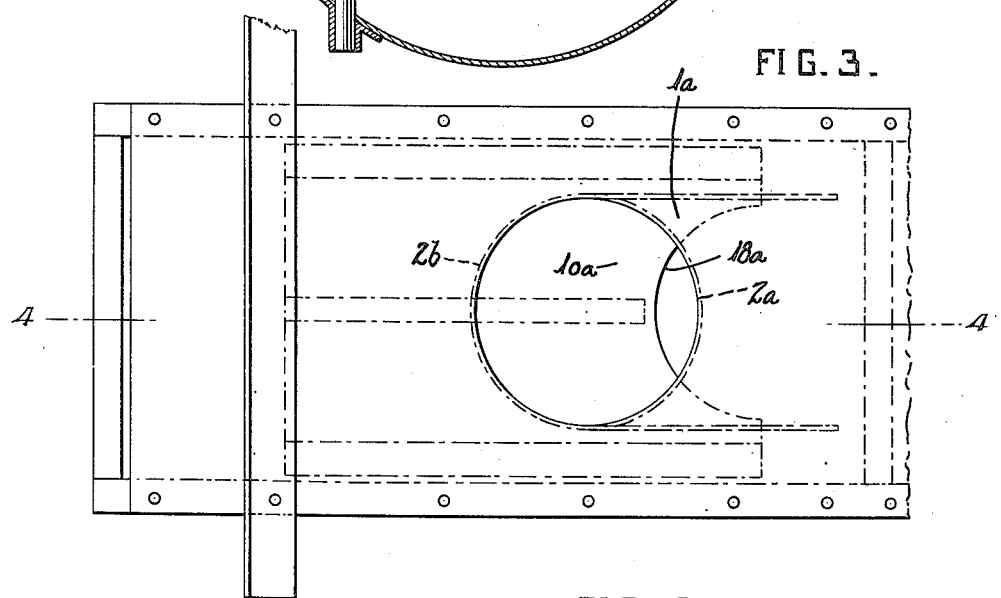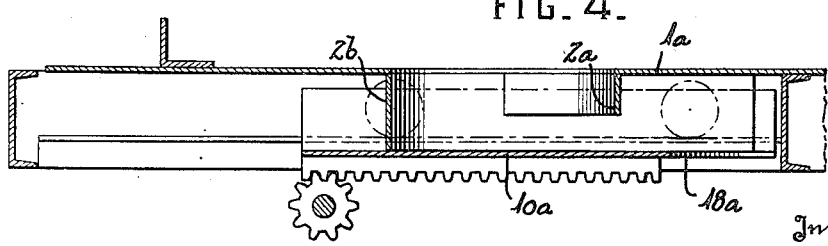

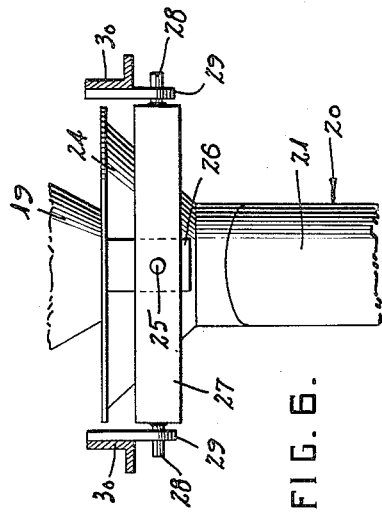
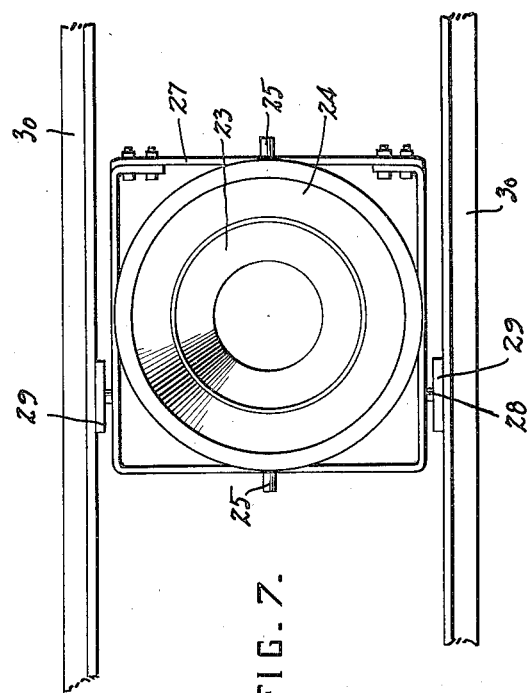
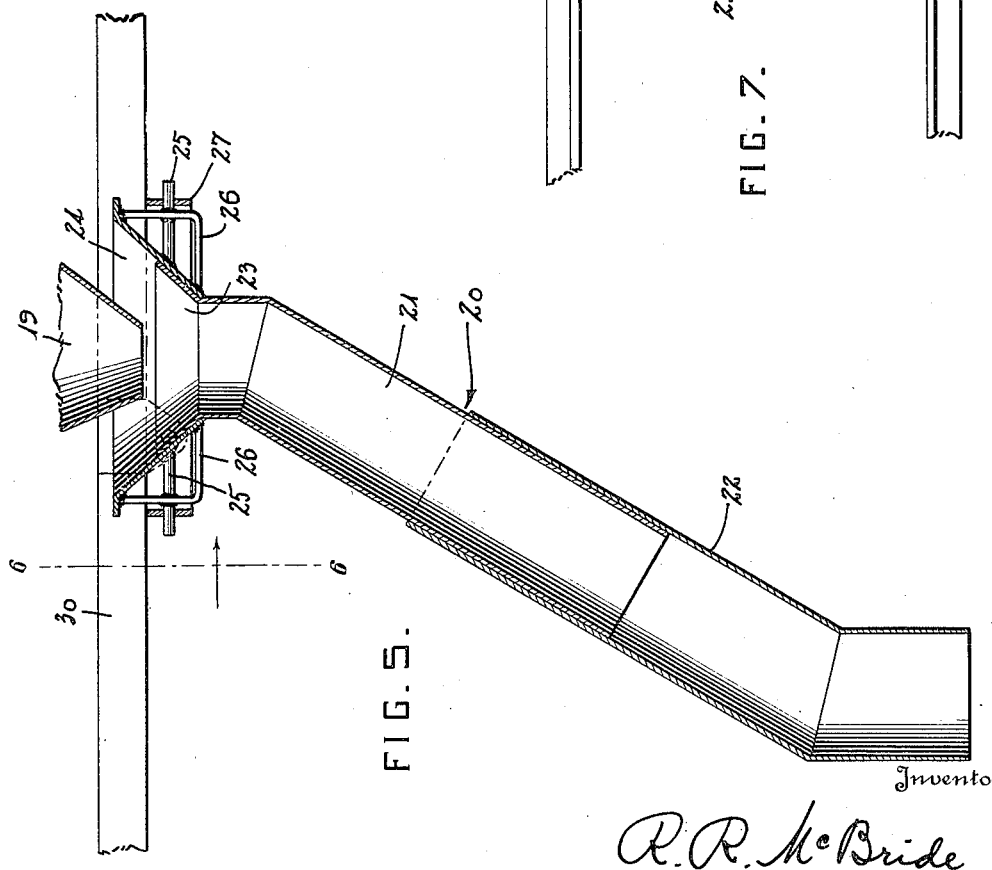

1,878,874

UNITED STATES PATENT OFFICE

ROBERT R. McBRIDE, OF WARREN, OHIO, ASSIGNOR TO THE HELTZEL STEEL FORM AND IRON COMPANY, OF WARREN, OHIO, A CORPORATION OF OHIO

BATCHER

Application filed July 23, 1929. Serial No. 380,336.

The present invention relates to batchers, such as are employed for discharging or delivering batches of cement, sand, or other material.

One object of the invention is the provision of a novel and improved dustless batcher which will eliminate the discharge of dust into the air during the operation of the batcher, the invention in this respect being an improvement over the dustless batcher disclosed in the application of George O. Harm, Serial No. 287,028, filed June 20, 1928.

Another object of the invention is to enclose the cut-off gate between the bin or hopper and the weighing or measuring chamber, in order to make the batcher dustless.

A further object is the provision of cut-off means between the bin or hopper and the weighing or measuring chamber which will enable the flow of material to be reduced and cut off quickly to facilitate accurate weighing.

A further object is to provide a novel discharge chute for the batcher for conveniently directing the material from the batcher.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a section on the line 2—2 of Fig. 1.

Fig. 3 is a plan view of a modified form of cut-off device.

Fig. 4 is a section on the line 4—4 of Fig. 3.

Fig. 5 is a vertical section of the discharge chute.

Fig. 6 is a cross section on the line 6—6 of Fig. 5.

Fig. 7 is a plan view of the upper portion of the discharge chute.

Figure 1:
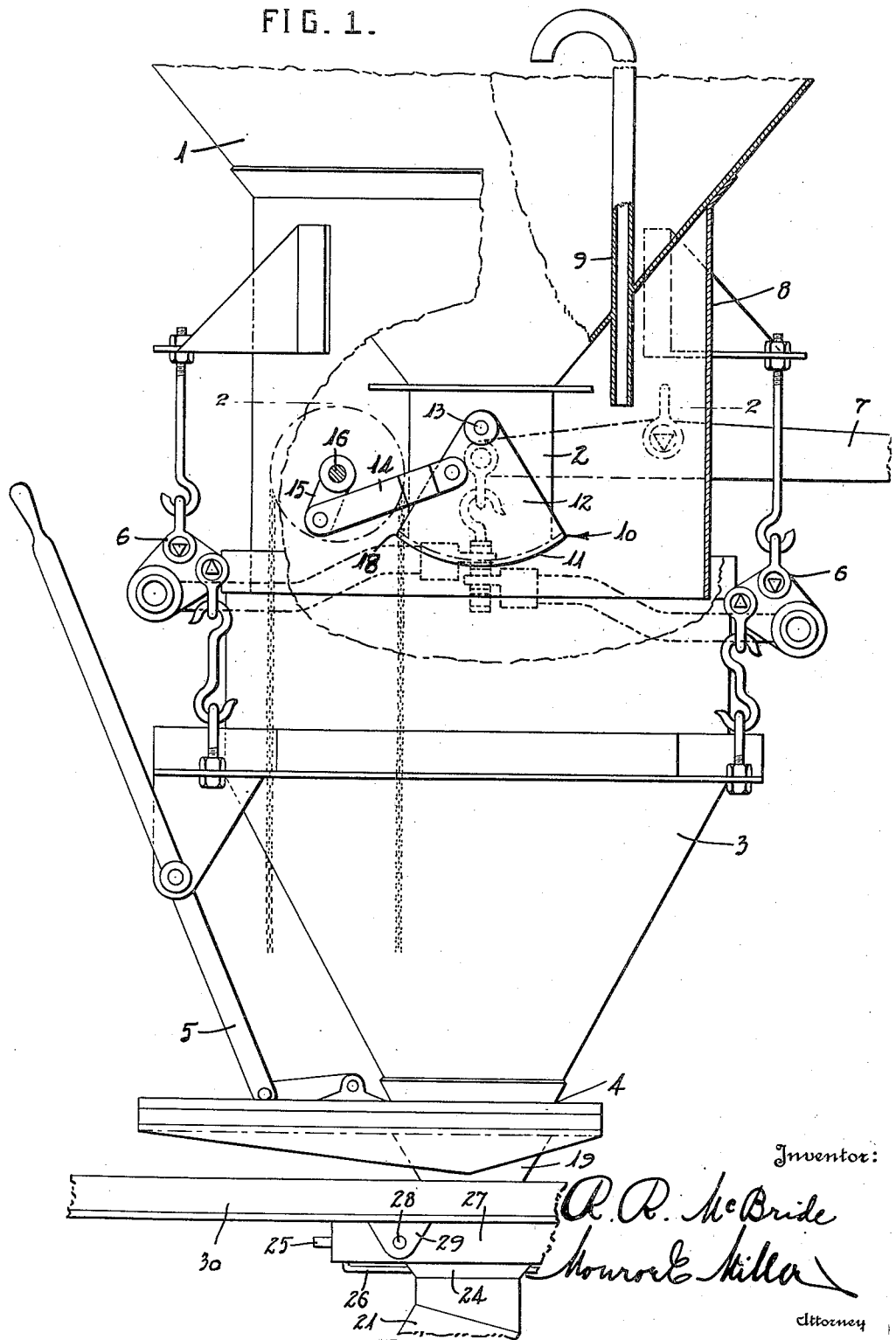
Figure 1 is a side elevation of the improved batcher, portions being broken away and shown in section.

Referring to Figs. 1 and 2, the bin or hopper 1 has a discharge spout 2 through which the material flows into the measuring or weighing chamber 3 having the discharge gate or valve 4 of any suitable kind, controlled by a lever 5 or other suitable means.

As shown, the device is a weighing batcher for delivering batches of predetermined weight, and the chamber 3 is suspended for vertical movement, as at 6, and is operably connected with a scale beam 7. Any suitable scale structure may be used.

In order to prevent dust from escaping when cement or other fine material is discharged from the bin into the measuring or weighing chamber 3, an annular apron 8 is secured to and depends from the bin or hopper around the spout 2 and is in telescopic relation with the chamber 3. A clearance may be provided between said apron and wall of the chamber, which may be closed by a diaphragm or bellows as disclosed in application Serial No. 287,028, supra. The apron 8 may have suitable hand holes or inspection doors for convenient access to the parts therein.

A vent pipe 9 extends upwardly into the bin 1 from within the apron 8, so that the air displaced from the chamber 3 by the material falling into the chamber, may flow upwardly through the pipe 8 into the bin, carrying the dust with it.

The apron 8 and chamber 3 completely enclose the spout 2 and cut off gate 10, and the air may flow freely through the pipe 9 to prevent air flowing outwardly to the atmosphere and discharging dust, such as is obnoxious as well as wasting the material. The lower end of the pipe 9 opens between the spout 2 and apron 8, while the upper end of the pipe preferably extends near the top of the bin above the material therein.

The gate 10 has the curved portion 11 and wings 12 pivoted, as at 13, to the spout 2, and the lower end of the spout is curved to conform to the curvature of the portion 11 which is curved about the axis of the hinge or pivot 13.

Links 14 connect the wings 12 with arms 15 on a rock shaft 16 which is journaled in the wall of the apron 8, and any suitable means may be connected to the shaft 16 on the exterior of the apron for conveniently opening and closing the gate 10.

It is customary in a manually controlled batcher that the attendant watch the dial or other indicator in order that the gate 10 may be closed when the material in the chamber 3 reaches the proper weight. However, with the cut-off gates heretofore used it is difficult to accurately control the material, when cutting off the flow thereof, so that it is more or less inconvenient to obtain accurate weight of the material in the chamber 3. Overweight of material frequently results either due to delayed cut-off of the material or the reopening of the gate when the material is below the desired weight in the weighing chamber.

In the present construction, with a spout 2 of square or rectangular cross-section, as seen in Fig. 2, the portion 11 of the gate has a V-shaped or cut-in front edge 18 to move under the spout.

Thus, as the weight of the material in the chamber 3 reaches the desired amount, the gate 10 may be partly closed, as seen in Fig. 2, thereby reducing the flow through the opening defined by the edge 18 and opposite wall of the spout 2. The flow may thus be cut down and, by moving the edge 18 under said wall of the spout, the flow may be reduced and cut off just as the pointer or indicator reaches the desired graduation.

Figs. 3 and 4 illustrate a modification in the cut-off device. 1a indicates the bottom of the bin or hopper from which the spout depends, and a flat gate or valve 10a is slidable under said spout.

The material in the bin or hopper flows down through the opening into the spout and rests on the gate or valve 10a, which gate is moved by a rack and pinion or other suitable device.

The spout is formed by a U-shaped bar 2b having its upper edge welded or otherwise secured to the bin bottom or plate 1a, and a curved bar 2a also secured to said plate 1a, with the bar 2a and intermediate or curved portion of the bar 2b surrounding the opening of the plate 1a. The bar 2b extends down close to the gate 10a, and its limbs extend longitudinally from the spout in the direction that the gate moves to closed position. The bar 2a has its lower edge spaced above the gate so that stones, pebbles and other solid particles will not wedge between the bar or wall 2a of the spout and the edge 18a of the gate.

The extended limbs of the bar 2b prevent the material on the gate from passing to the sides of the gate. Consequently, the gate 10a will not be jammed in its closing or opening movements.

The forward edge 18a of the gate is curved or semi-circular and in moving under the bar or wall 2a of the spout will reduce the flow, as seen in Fig. 3, and the flow may be cut off completely and quickly when the desired weight is reached.

In each form of cut-off device, the edge of the gate and portion of the spout toward which it moves when being closed, are so formed that when the gate approaches closed position the opening is reduced in size both longitudinally and transversely of the line of movement of the gate, so as to reduce the flow of material to a small stream that can be quickly cut off.

When the discharge gate 4 is opened the material is delivered through a chute 20 which comprises the telescoping sheet metal sections 21 and 22, which are inclined, and the lower section 22 may be slid upwardly and downwardly to bring the lower end thereof to the desired position.

The upper chute section 21 has a flared receiving end 23 seated in a funnel 24 disposed below the discharge member 19 of the batcher, and the chute section 21 has a swivel connection with the funnel 24 to permit the spout to be rotated about the axis of said funnel. The lower end of the chute may thus be turned to different positions.

Outstanding trunnions 25 are welded or otherwise secured to opposite sides of the funnel 24 and are made secure by angle braces 26 secured to said funnel and trunnions. The trunnions are mounted for turning movement in a rectangular yoke 27 surrounding the funnel, and having trunnions 28 outstanding therefrom in a line at right angles to the line of the trunnions 25. The trunnions 28 are mounted in hangers or bearing plates 29 secured to bars 30 of the batcher frame. The funnel 24 may turn about the axis of the trunnions 25, and may turn with the yoke 27 about the axis of the trunnions 28, thereby permitting the chute to be swung in various directions.

The chute may thus be extended and contracted, rotated about the axis of the funnel 24, and swung about the axes of the trunnions 25 and 28, in order that the lower end of the chute may be brought to the desired or necessary position for delivering the material.

A rubber or fabric flexible chute can be employed also.

Having thus described the invention, what is claimed as new is:

1. A batcher comprising a bin having a spout, a chamber below the spout to receive the material, a cut-off gate controlling the flow of material from the spout into said chamber, an apron surrounding the spout and extending from the bin to said chamber, and a vent tube leading upwardly from between said spout and apron into the bin.

2. A batcher comprising a bin having a spout, a vertically movable chamber below the spout to receive the material, a cut-off gate controlling the flow of material from the spout into said chamber, an apron depending from the bin around said spout and having a telescopic relation with said chamber, and a vent leading from the space between said spout and apron into the bin.

3. A batcher comprising a bin having a spout, a vertically movable chamber below the spout to receive the material, a cut-off gate controlling the flow of material from the spout into said chamber, an apron depending from the bin around said spout and having a telescopic relation with said chamber, and a vent tube leading from between the apron and spout into the bin.

4. A batcher comprising a bin having a spout, a chamber mounted for vertical movement below the spout to receive the material, a cut-off gate movable under said spout, an apron depending from the bin around the spout and having a telescopic relation with said chamber, and an operating shaft for said gate extending through said apron and operably connected with said gate.

5. A batcher comprising a bin having a spout, a chamber below the spout to receive the material therefrom, scale mechanism supporting said chamber, and a cut-off gate movable across said spout, the front edge of said gate and portion of the spout toward which it moves when the gate is closed being so formed as to reduce the size of the opening both longitudinally and transversely of the line of movement of the gate as the gate reaches closed position.

6. A batcher having a discharge portion, a yoke mounted for swinging movement about one axis, a funnel mounted for swinging movement about another axis in said yoke below said discharge portion, and a chute leading downwardly from said funnel.

7. A batcher having a discharge portion, a yoke mounted for swinging movement about one axis, a funnel below said discharge portion mounted for swinging movement about another axis in said yoke, and a chute having a swivel connection with said funnel.

8. A batcher having a discharge portion, a funnel mounted for swinging movement below said discharge portion, and a chute having a swivel connection with the funnel and adapted to swing therewith angularly toward and away from the vertical line of said discharge portion.

9. A batcher having discharge means, a flexible chute movably connected to said means, said chute adapted to move angularly toward and away from the vertical line of said discharge means.

10. A batcher comprising a bin having a spout, a chamber below the spout to receive the material, an apron surrounding the spout and extending from the bin to said chamber, and a vent leading upwardly from between said spout and apron into the bin.

11. A batcher comprising a bin having a spout, a movable weighing chamber below the spout to receive the material, said chamber being operably connected with a scale mechanism, means for controlling the flow of material from the spout into said weighing chamber, an apron surrounding the spout and extending from the bin into telescopic relation with the chamber, and a vent tube leading upwardly from between the spout and apron into the bin.

12. A batcher comprising a bin having a spout, a chamber below the spout to receive the material, means for controlling the flow of material from the spout into said chamber, an apron surrounding the spout and extending from the bin into telescopic relation with said chamber, and a vent leading from the space between said spout and apron into the bin.

13. A batcher having a discharge portion, a funnel below said discharge portion mounted for swinging movement to different angular positions toward and away from the vertical line of said discharge portion, and a chute having an upper flared end seated in said funnel for turning movement.

In testimony whereof I hereunto affix my signature.

ROBERT R. McBRIDE.